May 19, 1970
G. B. LYNCH ET AL
3,512,872
VARIABLE MAGNIFICATION LENS SYSTEM
Filed July 16, 1968
2 Sheets-Sheet 1
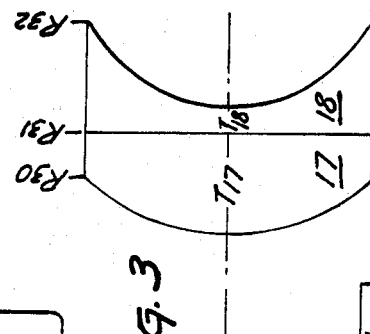
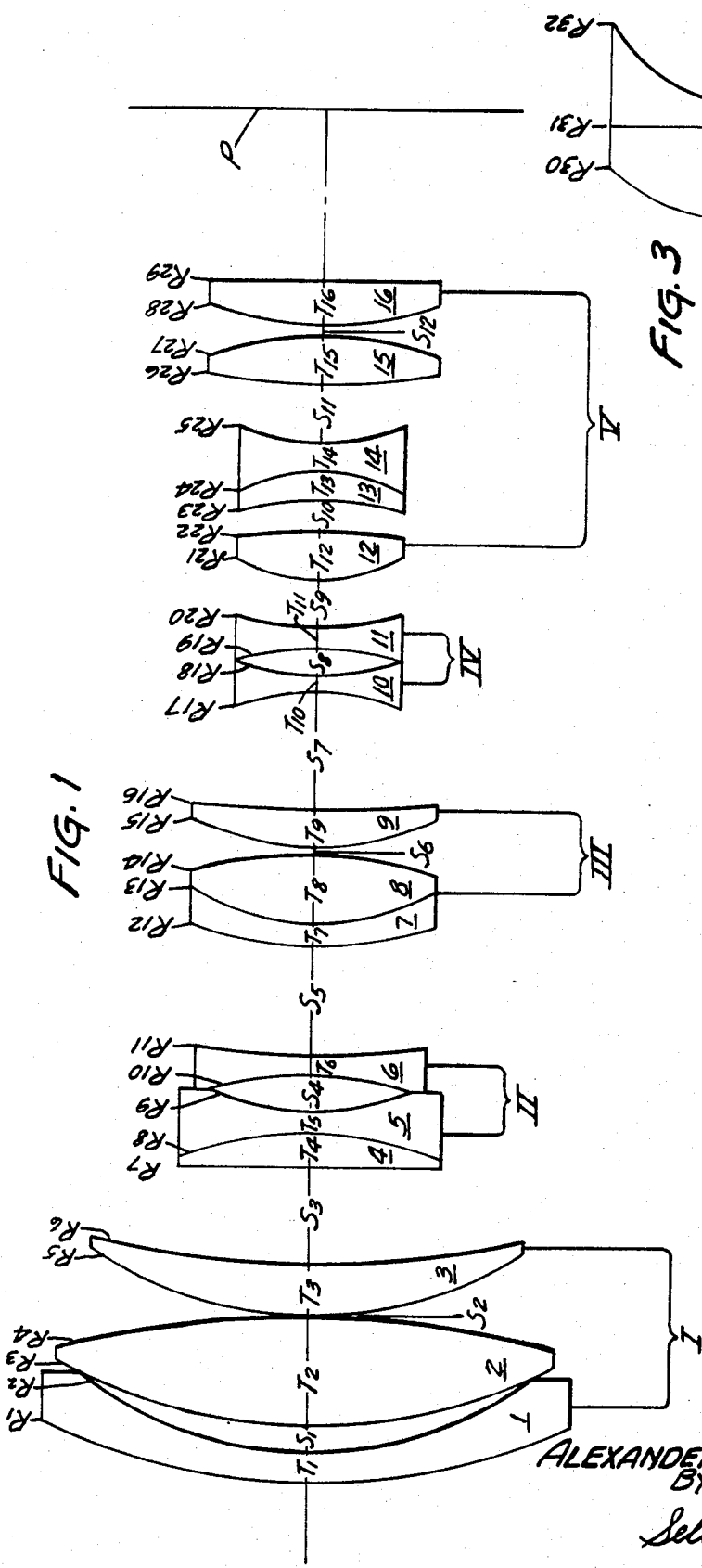
| LENS | N | V | RADII M.M. | THICKNESS OR AXIAL SEPARATION IN M.M. |
|---|---|---|---|---|
| 17 | 1.720 | 29.3 | $R_{30}$ +80.5 | $T_{17}$ = 2.0 |
|  |  |  | $R_{31}$ ∞ |  |
| 18 | 1.620 | 60.3 | $R_{32}$ 9.85 | $T_{18}$ = 1.0 |
FIG. 4
INVENTORS
GERALDINE B. LYNCH
ALEXANDER EUGENE TURULA
BY Kinney, Alexander,
Sell, Steldt & DeLaHunt
ATTORNEYS

FIG. 2

| LENS | N | V | RADII M.M. | THICKNESS OR AXIAL SEPARATION IN M.M. |
|---|---|---|---|---|
| 1 | 1.720 | 29.3 | $R_1$ +2322.88 | $T_1$ = 3.50 |
|  |  |  | $R_2$ + 81.00 |  |
|  |  |  |  | $S_1$ = 1.00 |
| 2 | 1.61785 | 52.59 | $R_3$ + 90.40 | $T_2$ = 13.50 |
|  |  |  | $R_4$ −188.68 |  |
|  |  |  |  | $S_2$ = 0.10 |
| 3 | 1.6200 | 60.3 | $R_5$ + 54.00 | $T_3$ = 7.85 |
|  |  |  | $R_6$ + 140.92 |  |
|  |  |  |  | $S_3$·VARIES FROM 1.00 TO 53.507 |
|  |  |  | $R_7$ ∞ | $T_4$ = 5.30 |
| 4 | 1.7506 | 27.8 | $R_8$ −52.00 |  |
| 5 | 1.5880 | 61.2 | $R_9$ +25.55 | $T_5$ = 2.00 |
|  |  |  |  | $S_4$ = 6.00 |
| 6 | 1.6910 | 54.8 | $R_{10}$ −38.00 | $T_6$ = 1.30 |
|  |  |  | $R_{11}$ +219.00 |  |
|  |  |  |  | $S_5$·VARIES FROM 74.795 TO 0.10 |
|  |  |  | $R_{12}$ +101.65 | $T_7$ = 1.00 |
| 7 | 1.69963 | 34.68 | $R_{13}$ + 21.34 |  |
| 8 | 1.6570 | 57.2 | $R_{14}$ −47.50 | $T_8$ = 10.10 |
|  |  |  |  | $S_6$ = 0.10 |
| 9 | 1.6200 | 60.3 | $R_{15}$ +38.50 | $T_9$ = 4.08 |
|  |  |  | $R_{16}$ + 779.30 |  |
|  |  |  |  | $S_7$·VARIES FROM 4.075 TO 26.263 |
| 10 | 1.5170 | 64.5 | $R_{17}$ − 77.50 | $T_{10}$ = 1.00 |
|  |  |  | $R_{18}$ +58.60 |  |
|  |  |  |  | $S_8$ = 1.30 |
| 11 | 1.5170 | 64.5 | $R_{19}$ −68.25 | $T_{11}$ = 1.00 |
|  |  |  | $R_{20}$ +68.25 |  |
|  |  |  |  | $S_9$ = 3.00 |
| 12 | 1.620 | 60.3 | $R_{21}$ + 20.0 | $T_{12}$ = 5.40 |
|  |  |  | $R_{22}$ −140.0 |  |
|  |  |  |  | $S_{10}$ = 3.42 |
|  |  |  | $R_{23}$ −42.30 | $T_{13}$ = 4.68 |
| 13 | 1.6890 | 30.9 | $R_{24}$ −12.50 |  |
| 14 | 1.6725 | 32.2 | $R_{25}$ +18.00 | $T_{14}$ = 2.97 |
|  |  |  |  | $S_{11}$ = 3.96 |
| 15 | 1.620 | 60.3 | $R_{26}$ + 93.50 | $T_{15}$ = 3.60 |
|  |  |  | $R_{27}$ −37.00 |  |
|  |  |  |  | $S_{12}$ = 0.18 |
| 16 | 1.620 | 60.3 | $R_{28}$ +30.40 | $T_{16}$ = 3.79 |
|  |  |  | $R_{29}$ ∞ |  |

INVENTORS
GERALDINE B. LYNCH
ALEXANDER EUGENE TURULA
BY Kinney, Alexander, Sell, Steldt & DeLa Hunt
ATTORNEYS United States Patent Office 3,512,872
Patented May 19, 1970

3,512,872
VARIABLE MAGNIFICATION LENS SYSTEM
Geraldine B. Lynch and Alexander Eugene Turula, Rochester, N.Y., assignors, by mesne assignments, to Wollensak, Inc., Rochester, N.Y., a corporation of Delaware
Filed July 16, 1968, Ser. No. 745,301
Int. Cl. G02b *15/02, 15/00, 9/00*
U.S. Cl. 350—183                          2 Claims

ABSTRACT OF THE DISCLOSURE

A variable focus objective lens having a range in the order of 1:11 with a constant high relative aperture throughout said range and which is corrected for residual aberration.

---

The present invention relates to variable magnification optical systems and in particular to a mechanically-compensated variable magnification objective optical system usable with a stationary television-transmitting camera or a cinematographic camera to produce an image of continuously variable size of an object located at a fixed distance from the system. An objective optical system of this type is commonly known as a "zoom" lens, in that it is capable of maintaining a constant image plane while its equivalent focal length varies throughout a range of axial movement of certain members of the optical system relative to certain other stationary members of the system.

Zoom lenses are well known in the fields of optics and photography. The practical value of the zoom system is widely accepted in the art, since a single objective can be substituted for a plurality of lenses, and thus eliminate the inconvenience encountered by the necessity of changing objectives to effect a change in the magnification of the object and the discontinuity of the image.

Optical systems of the zoom type used on cameras frequently have front and rear assemblies; and the terms "front" and "rear" are used to relate the parts or groups of lens elements of the system assembly which are located respectively near to and further from the object, and the movable members or groups are part of the front assembly.

There are numerous prior patents on zoom lenses including applicants' prior U.S. Pats. Nos. 2,925,010 and 3,000,259, and a U.S. patent issued to Back et al., No. 2,718,817. These prior patents disclose systems of variable magnification in a range of between 1:3 and 1:5. Only one of these lens systems, No. 2,925,010, has a constant relative aperture throughout the focal length range but the range is very short, being only 1:3. In Pat. No. 3,000,259 the lens system has a relative aperture of $f/2.7$ when the lens is adjusted for an equivalent focal length ranging from 30 mm. to 120 mm. and a relative aperture of $f/3.5$ when the lens is adjusted for a focal length range of 120 mm. to 150 mm., therefore in a full range of 1:5 the relative aperture changed which would cause a change in exposure or light intensity.

The present invention has the advantage of providing a zoom system with a greatly increased varifocal range in the order of about 1:11 and a constant high relative aperture.

Another advantage of the present invention is the greatly increased aperture ratios while still minimizing the variation of residual aberrations when zooming from the shortest to the longest focal length range.

The optical lens system of the present invention has as its general configuration a zoom objective lens consisting of two distinct sections, a variable afocal front assembly and an image forming rear assembly. The front variable afocal assembly, consists of four groups of elements arranged in such a manner that, with respect to incident light, the first and third groups have positive focal lengths and contribute convergent power, while the second and fourth groups are divergent, thereby contributing negative power to the system. To effect a change in magnification of the object, the second and third groups of elements are moved axially but in variable or differential relation to each other. The first group and the fourth group remain axially stationary during the zooming, however the members in the first group are movable for focusing. The axial movement of the second group causes the variation in equivalent focal length of the system, while the image shift compensation is effected by the axial movement of the third group of this assembly in such a manner as to maintain a fixed focal plane throughout the entire focal length range. When the two movable groups of elements are physically positioned at the furthest distance from each other in their relative zooming movement, the magnifying power of the front assembly is determined to be .38×. When the axial movement of these two groups results in the second group being juxtapositioned to the third group, the magnifying power of the afocal optical assembly is determined to be 4.2×. This provides the aforementioned range of magnification change of the order of 1:11. In accordance with a feature of this invention by so dimensioning the distribution of power between the convergent and divergent groups of elements of the front assembly, the previously mentioned object of providing a greatly increased range of magnification is realized.

The rear image-forming assembly or the fifth group of the lens system is stationary and so constructed and corrected to compensate for residual aberrations of the front assembly so that, in conjunction with the front assembly, it is capable of providing a constant high relative aperture throughout the entire range of magnification variation.

To focus the lens system upon an object at a finite distance, the first group is moved axially, independently of all other components or groups. A movement of 8.32 mm. of this group permits a near focusing distance of five feet or 152.4 cm.

The above and other advantages will be more fully understood upon reading the following detailed description which refers to the accompanying drawing forming a part thereof and in which:

FIG. 1 is a diagrammatic view of an objective optical system according to a preferred form of the present invention;

FIG. 2 is a table of numerical data with respect to one specific embodiment of such an optical system as is shown in FIG. 1;

FIG. 3 is a diagrammatic view of a negative achromatic doublet which may be used as a 2× converter in conjunction with the objective optical system shown in FIG. 1; and FIG. 4 is a table of numerical data with respect to a specific embodiment of the doublet as is shown in FIG. 3.

The varifocal objective lens system of the preferred form of the present invention comprises a front and a rear assembly. The front assembly is an afocal optical system consisting of eleven lens elements numbered consecutively from 1 to 11 from front to rear. These elements are further identified in FIG. 1 as constituting four groups designated by the Roman numerals I, II, III and IV. The rear assembly is the image-forming lens and comprises five lens elements designated as group V in FIG. 1. Subject only to the limitations that the equivalent focus of the rear member is chosen so as to cover a total angular field of 25° and that the group as a whole is suitably corrected to compensate for any residual aberration of the front assembly, this group is capable of considerable variation and may be as simple or as complex as desired.

Since group V meets these specified requirements, it is used herein as an exemplary lens assembly of a preferred form of the present invention. The individual lens elements of this group as shown in FIG. 1 are numbered 12 to 16 inclusive.

In the following description and in the accompanying drawing the radii of curvature, R, the axial thicknesses, T, and the axial separation between glass elements, S, are all expressed in the conventional manner with the usual subscripts to identify the particular surface, radius, lens thickness or axial separation referred to, numbered consecutively from front to rear. The plus and minus values of the radii, R, indicate surfaces respectively convex and concave toward incident light. As is customary in the art, a single surface number is assigned to cemented surfaces common to two elements. Thus, for example, $R_8$ indicates the common radius of the rear surface of element 4 and the front surface of element 5.

The respective refractive indices, expressed with references to the spectral D line of sodium, are indicated by N and the dispersive indices or Abbe numbers are indicated by V. The focal lengths of the various groups of elements are arbitrarily designated as F-subscript where the subscript references the particular group with which the equivalent focal length is associated.

Group I consists of three air-spaced elements of which element 1 is a negative meniscus, element 2 is a double convex lens and element 3 is a positive meniscus. The focal length ($F_I$) of this group is +108.85 mm., thereby contributing convergent power to the system.

Group II consists of three elements, elements 4, 5, and 6. Element 4 is a plano-convex lens which is cemented to element 5 a biconcave lens to form a negative doublet, and element 6, is an airspaced double concave lens. Negative or divergent power is contributed to the system by group II since $F_{II}$ is −22.9 mm.

Convergent power is contributed by group III whose focal length ($F_{III}$) is +30.2 mm. Group III consists of three elements 7, 8, and 9. Element 7 is a negative meniscus cemented to element 8, a biconvex lens, to form a positive doublet, and element 9 is an airspaced positive meniscus.

The focal length ($F_{IV}$) of group IV is −32.1 mm. and this group consists of two airspaced, double concave lens elements, 10 and 11. Divergent power is contributed by group IV.

Group V which comprises the rear assembly is a stationary image-forming lens, which consists of five elements of which element 12 is a double convex lens, element 13 is a positive meniscus which is cemented to element 14, a biconcave lens, to form a negative doublet, element 15 is a double convex lens, and element 16 is a plano-convex lens. $F_V$ is +36.2 mm., and this rear assembly subtends a total angular field coverage of at least 25°.

When the two movable groups II and III are so positioned that they are at the furthest distance from each other in their relative zooming movement, i.e. a differentially variable or mechanically compensated movement, the focal length of the combination of group I and group II, herein designated as $F_a$, is −34.18 mm., while the focal length of the combination of group III and group IV, herein designated as $F_b$, is +89.05 mm. This relates to the shortest focal length of the zooming range. When the two movable groups (II and III) have attained the extreme of their relative zooming movement, $F_a$ is −122.10 mm. and $F_b$ is +29.23 mm. This relates to the position of longest focal length of the zooming range. The relationship is thus established that in the shortest focal length position, designated by $M_s$:

$$M_s = F_a/F_b = .38$$

and in the longest focal length position, designated by $M_L$:

$$M_L = F_a/F_b = 4.18$$

which relationship permits the realization of a range of magnification variation of the order of 1:11 or $M_L$ divided by $M_s$.

Zoom lens systems are sensitive to object position, since a change in object position shifts the focal point of the first element or group of elements with respect to the other elements or groups of elements of the system. This permits the first element or group of elements to be moved with respect to the rest of the system to enable focusing at short distances while still maintaining precise image shift compensation. An 8.32 mm. movement of this first group permits a near focusing distance of five feet or 152.4 cm.

According to a preferred embodiment of the present invention, the objective lens system can be constructed as represented by the numerical values in FIG. 2 for the radii, $R_1$ to $R_{29}$, the lens thicknesses, $T_1$ to $T_{16}$, the axial separations, $S_1$ to $S_{12}$, along with the corresponding indices of refraction for the spectral D line of sodium and the dispersive indices for the various lens elements; said lens system will produce excellent results for a zoom lens system having a constant relative aperture of $f/2.2$ (1:2.2) throughout a focal length range adjustable between a minimum focal length of 13.75 mm. to a maximum focal length of 151.25 mm. The various symbols in FIG. 2 have the meanings previously described in the disclosure. All dimensions for R, T and S are given in millimeters. The back focus, which is defined as the distance measured from the rear vertex of the last element 16 of group V to the principal focal plane P located in the back space, remains constant at 22.0 mm. Table 1 below shows examples of the proper settings of the variable spacings $S_3$, $S_5$, $S_7$, to produce various equivalent focal lengths of the lens system.

TABLE 1

| $S_3$ | $S_5$ | $S_7$ | EF |
|---|---|---|---|
| 1.0 | 74.795 | 4.075 | 13.75 |
| 3.76342 | 71.64159 | 4.465 | 15.00 |
| 13.44964 | 60.35036 | 6.070 | 20.00 |
| 25.24156 | 45.81344 | 8.815 | 30.00 |
| 29.73372 | 39.92128 | 10.215 | 36.00 |
| 32.12018 | 36.67982 | 11.070 | 40.00 |
| 36.75272 | 30.10228 | 13.015 | 50.00 |
| 42.92944 | 20.48556 | 16.455 | 70.00 |
| 46.71970 | 13.85030 | 19.300 | 90.00 |
| 49.38692 | 8.55308 | 21.930 | 110.00 |
| 51.21186 | 3.8800 | 24.77814 | 130.00 |
| 53.507 | 0.10 | 26.263 | 151.25 |

FIG. 3 is a diagrammatic sketch of a negative achromatic doublet consisting of elements 17 and 18, a plano-convex lens and a plano-concave lens, respectively, cemented together. This doublet, when positioned between group V and the focal plane F in such a way that the axial separation between the rear vertex of element 16 and the front vertex of element 17 is 10.5 mm., has the property of a 2× converter which changes the equivalent focal lengths of the zoom system of FIG. 1 by a factor of 2 with a constant relative aperture ratio of $f/4.4$ (1:4.4).

An example of a specific lens consisting of an afocal front lens assembly, an image forming rear lens assembly and a converter lens assembly may be constructed in accordance with the numerical data given in Table 2 below. The various symbols in the table have the meaning previously described in the disclosure. All dimensions are given in millimeters. The refractive indices are given for the spectral D line of sodium. A lens system constructed according to the specified numerical data in Table 2 will give excellent results even at the extremes of variation, and will have a constant relative aperture of $f/4.4$ throughout a focal length range adjustable between a minimum focal length of 27.5 mm. to a maximum focal length of 302.5 mm. A lens so constructed comprises a converter doublet, such as diagrammatically shown in FIG. 3, and the lens system diagrammatically shown in FIG. 1.

TABLE 2

| Lens | N | V | Radii | Thickness or axial separation |
|------|---|---|-------|-------------------------------|
| 1 | 1.720 | 29.3 | $R_1=+2,322.88$ | $T_1=3.50$ |
|  |  |  | $R_2=+81.00$ | $S_1=1.00$ |
|  |  |  | $R_3=+90.40$ | $T_2=13.50$ |
| 2 | 1.61785 | 52.59 | $R_4=-188.68$ | $S_2=0.10$ |
|  |  |  | $R_5=+54.00$ | $T_3=7.85$ |
| 3 | 1.6200 | 60.3 | $R_6=+140.92$ | $S_2$ varies from 1.00 to 53.507 |
| 4 | 1.7506 | 27.8 | $R_7=\infty$ | $T_4=5.30$ |
|  |  |  | $R_8=-52.00$ |  |
| 5 | 1.5880 | 61.2 | $R_9=+25.55$ | $T_5=2.00$ |
|  |  |  | $R_{10}=-38.00$ | $S_4=6.00$ |
| 6 | 1.6910 | 54.8 | $R_{11}=+219.00$ | $T_6=1.30$ |
|  |  |  |  | $S_5$ varies from 74.795 to 0.10 |
|  |  |  | $R_{12}=+101.65$ | $T_7=1.00$ |
| 7 | 1.69963 | 34.68 | $R_{13}=+21.34$ |  |
| 8 | 1.6570 | 57.2 | $R_{14}=-47.50$ | $T_8=10.10$ |
|  |  |  | $R_{15}=+38.50$ | $S_6=0.10$ |
| 9 | 1.6200 | 60.3 | $R_{16}=+779.30$ | $T_9=4.08$ |
|  |  |  |  | $S_7$ varies from 4.075 to 26.263 |
|  |  |  | $R_{17}=-77.50$ | $T_{10}=1.00$ |
| 10 | 1.5170 | 64.5 | $R_{18}=+58.60$ |  |
|  |  |  | $R_{19}=-68.25$ | $S_8=1.30$ |
| 11 | 1.5170 | 64.5 | $R_{20}=+68.25$ | $T_{11}=1.00$ |
|  |  |  | $R_{21}=+20.0$ | $S_9=3.00$ |
| 12 | 1.6200 | 60.3 | $R_{22}=-140.0$ | $T_{12}=5.40$ |
|  |  |  | $R_{23}=-42.30$ | $S_{10}=3.42$ |
| 13 | 1.6890 | 30.9 | $R_{24}=-12.50$ | $T_{13}=4.68$ |
| 14 | 1.67250 | 32.2 | $R_{25}=+18.00$ | $T_{14}=2.97$ |
|  |  |  | $R_{26}=+93.50$ | $S_{11}=3.96$ |
| 15 | 1.6200 | 60.3 | $R_{27}=-37.00$ | $T_{15}=3.60$ |
|  |  |  | $R_{28}=+30.40$ | $S_{12}=0.18$ |
| 16 | 1.6200 | 60.3 | $R_{29}=\infty$ | $T_{16}=3.79$ |
|  |  |  | $R_{30}=+80.5$ | $S_{13}=10.50$ |
| 17 | 1.720 | 29.3 | $R_{31}=\infty$ | $T_{17}=2.0$ |
| 18 | 1.620 | 60.3 | $R_{32}=+9.85$ | $T_{18}=1.0$ |

Table 3 below is a supplementary table relating various settings for the variable axial separation to their corresponding equivalent focal lengths for a lens system whose focal length range is adjustable from 27.5 mm. to 302.5 mm. or having a range of 1:11.

TABLE 3

| $S_3$ | $S_5$ | $S_7$ | $EF$ |
|-------|-------|-------|------|
| 1.0 | 74.795 | 4.075 | 27.50 |
| 3.76342 | 71.64158 | 4.465 | 30.00 |
| 13.44964 | 60.35036 | 6.070 | 40.00 |
| 25.24156 | 45.81344 | 8.815 | 60.00 |
| 29.73372 | 39.92128 | 10.215 | 72.00 |
| 32.12018 | 36.67982 | 11.070 | 80.00 |
| 36.75272 | 30.10228 | 13.015 | 100.00 |
| 42.92944 | 20.48556 | 16.455 | 140.00 |
| 46.71970 | 13.85030 | 19.300 | 180.00 |
| 49.38692 | 8.55308 | 21.930 | 220.00 |
| 51.21186 | 3.8800 | 24.77814 | 260.00 |
| 53.507 | 0.10 | 26.263 | 302.50 |

According to the present invention, good image quality can be obtained by constructing a lens in the preferred form having the parameters as specified in FIG. 2 or in Table 2. To those skilled in the art, it is evident that a certain amount of modification in the specified parameters would still yield an acceptable lens system. However, for reasons indicated below, modification should be held within the following restrictive limitations for the various groups of elaments.

Group I:

$$+2100.0 < R_1 < +2500.0$$
$$+77.0 < R_2 < +85.0$$
$$+89.5 < R_3 < +91.5$$
$$-184.5 < R_4 < -192.5$$
$$+51.0 < R_5 < +56.5$$
$$+133.9 < R_6 < +148.0$$

Aberrations in the longest focal length positions are most seriously affected by the radii of the elements in this group. Residual spherical aberration, field curvature and distortion are increased objectionably when the limits specified for $R_3$ and $R_4$ are violated. Although the other radii are not as sensitive to variation as $R_3$ and $R_4$, too serious a deviation from the ranges indicated above creates a difficult problem of balancing residual aberrations throughout the entire focal range.

Group II:

$$-2000.0 < R_7 < +500.0$$
$$-48.0 < R_8 < -57.5$$
$$+23.5 < R_9 < +28.5$$
$$-35.0 < R_{10} < -41.5$$
$$+195.0 < R_{11} < +242.0$$

Lens performance in the shortest focal length region is affected by changes in parameters in group II. Vignetting can be seriously affected by adverse bending of $R_8$, $R_{10}$, and $R_{11}$. Radii $R_7$, $R_9$ and $R_{10}$ play an important part in controlling distortion at the shortest focal length range. Radius $R_{10}$ also affects the distortion at the normal position.

Group III:

$$+91.5 < R_{12} < +112.0$$
$$+19.5 < R_{13} < +24.0$$
$$-43.0 < R_{14} < -52.0$$
$$+36.5 < R_{15} < +40.5$$
$$+700.0 < R_{16} < +850.0$$

Group III affects the field curvature characteristics and the distortion at the normal position of the focal length range. Distortion in the long focal length and normal positions can be changed by $R_{12}$ and $R_{14}$. Bending element 9 (changing radii $R_{15}$ and $R_{16}$) has the greatest effect on the field curvature at the normal position. Group III functions during zoom movement of groups II and III to compensate for any image shift errors.

Group IV:

$$-70.0 < R_{17} < -85.0$$
$$+52.5 < R_{18} < +64.0$$
$$-61.5 < R_{19} < -75.0$$
$$+61.5 < R_{20} < +75.0$$

Radii $R_{17}$ and $R_{18}$ in this group can be used for field curvature correction to a modest degree for the short focal length positions. The effect of this group IV on residual spherical aberration remains approximately constant throughout the entire zooming range.

As was previously mentioned, group V is capable of variation and can be as simple or complex as desired within the limitation that it must be capable of subtending a total angular field coverage of at least 25°, must be so constructed as to compensate for residual aberration variation introduced by the afocal front lens system and must yield a high relative aperture, preferably $f/2.2$.

What is claimed is:

1. An objective lens system of variable magnification power comprising an afocal front lens assembly and an image forming rear lens assembly, the characteristics of the various elements of the afocal front lens assembly and the image forming rear lens assembly and their spatial relationships to each other being substantially of the proportions indicated by the numerical data in the following table:

| Lens | N | V | Radii, mm. | Thickness or axial separation, mm. |
|---|---|---|---|---|
| 1 | 1.720 | 29.3 | $R_1=+2,322.88$ | $T_1=3.50$ |
|  |  |  | $R_2=+81.00$ | $S_1=1.00$ |
| 2 | 1.61785 | 52.59 | $R_3=+90.40$ | $T_2=13.50$ |
|  |  |  | $R_4=-188.68$ | $S_2=0.10$ |
| 3 | 1.620 | 60.3 | $R_5=+54.00$ | $T_3=7.85$ |
|  |  |  | $R_6=+140.92$ | $S_3$ varies from 1.00 to 53.507 |
| 4 | 1.7506 | 27.8 | $R_7=\infty$ | $T_4=5.30$ |
|  |  |  | $R_8=-52.00$ |  |
| 5 | 1.5880 | 61.2 | $R_9=+25.55$ | $T_5=2.00$ |
|  |  |  | $R_{10}=-38.00$ | $S_4=6.00$ |
| 6 | 1.6910 | 54.8 | $R_{11}=+219.00$ | $T_6=1.30$ |
|  |  |  |  | $S_5$ varies from 74.795 to 0.10 |
| 7 | 1.69963 | 34.68 | $R_{12}=+101.65$ | $T_7=1.00$ |
|  |  |  | $R_{13}=+21.34$ |  |
| 8 | 1.6570 | 57.2 | $R_{14}=-47.50$ | $T_8=10.10$ |
|  |  |  | $R_{15}=+38.50$ | $S_6=0.10$ |
| 9 | 1.620 | 60.3 | $R_{16}=+779.30$ | $T_9=4.08$ |
|  |  |  |  | $S_7$ varies from 4.075 to 26.263 |
| 10 | 1.517 | 64.5 | $R_{17}=-77.50$ | $T_{10}=1.00$ |
|  |  |  | $R_{18}=+58.60$ | $S_8=1.30$ |
|  |  |  | $R_{19}=-68.25$ |  |
| 11 | 1.517 | 64.5 | $R_{20}=+68.25$ | $T_{11}=1.00$ |
|  |  |  | $S_{21}=+20.00$ | $S_9=3.00$ |
| 12 | 1.620 | 60.3 | $R_{22}=-140.00$ | $T_{12}=5.40$ |
|  |  |  | $R_{23}=-42.30$ | $S_{10}=3.42$ |
| 13 | 1.6890 | 30.9 | $R_{24}=-12.50$ | $T_{13}=4.68$ |
| 14 | 1.6725 | 32.2 | $R_{25}=+18.00$ | $T_{14}=2.97$ |
|  |  |  | $R_{26}=+93.50$ | $S_{11}=3.96$ |
| 15 | 1.620 | 60.3 | $R_{27}=-37.00$ | $T_{15}=3.60$ |
|  |  |  | $R_{28}=+30.40$ | $S_{12}=0.18$ |
| 16 | 1.620 | 60.3 | $R_{29}=\infty$ | $T_{16}=3.79$ | in which the elements are numbered in order from the front to the rear of the lens system, the corresponding refractive indices N for the spectral D line of sodium and the dispersive indices V are given for each element, the radii of curvature R of each element surface are given with the respective surfaces being numbered from front to rear and being identified respectively by a subscript numeral for each R with plus and minus values of R indicating surfaces curved respectively convex and concave with respect to incident light, the axial thicknesses T of the respective elements are given and each T is identified by its respective numeral subscript and the axial separation S between air spaced elements are given and are identified by its numerical subscript successively from front to rear.

2. An objective lens system as described in claim 2 including a 2× lens converter assembly airspaced 10.50 mm. from the vertex of said element 16 which lens converter assembly has elements of the proportions indicated by the numerical data in the following table:

| Lens | N | V | Radii, mm. | Thickness or axial separation, mm. |
|---|---|---|---|---|
| 17 | 1.720 | 29.3 | $R_{30}=+80.5$ | $T_{17}=2.0$ |
|  |  |  | $R_{31}=\infty$ |  |
| 18 | 1.620 | 60.3 | $R_{32}=+9.85$ | $T_{18}=1.0$ | wherein N, V, R and T have the same references as in claim 1.

References Cited

UNITED STATES PATENTS 3,294,471  12/1966  Back _____ 350—184

FOREIGN PATENTS 943,180  12/1963  Great Britain.
1,210,463  3/1960  France.

DAVID SCHONBERG, Primary Examiner

P. A. SACHER, Assistant Examiner

U.S. Cl. X.R.
350—184, 186, 212, 214